United States Patent [19]
Kieronski

[11] Patent Number: 4,941,777
[45] Date of Patent: Jul. 17, 1990

[54] APPARATUS FOR CONVEYING MATERIAL

[75] Inventor: John P. Kieronski, Charlotte, N.C.

[73] Assignee: Home Courier Corporation, Concord, N.C.

[21] Appl. No.: 272,106

[22] Filed: Nov. 16, 1988

Related U.S. Application Data

[63] Continuation-in-part of Ser. No. 876, Jan. 6, 1987, abandoned.

[51] Int. Cl.$^5$ .................. B65E 51/20; B65E 51/32
[52] U.S. Cl. ........................... 406/13; 406/83; 406/110; 406/147; 406/164; 406/176; 406/189; 406/190
[58] Field of Search ............ 406/1, 3, 13, 19, 83, 406/108–111, 147, 148, 154, 164–166, 176, 184, 187–190, 74, 105, 112, 23, 24

[56] References Cited

U.S. PATENT DOCUMENTS

| | | | |
|---|---|---|---|
| 3,148,845 | 9/1964 | Buchwald | 406/105 |
| 3,305,191 | 2/1967 | Buchwald | 406/19 |
| 3,408,113 | 10/1968 | Bouladon | 456/19 |
| 3,756,537 | 9/1973 | Freese | 406/188 |
| 3,788,577 | 1/1974 | Barnett et al. | 243/35 |
| 3,853,355 | 12/1974 | Buisson | 302/2 R |
| 4,395,164 | 7/1983 | Beltrop et al. | 406/74 |
| 4,466,761 | 8/1984 | Beltrop et al. | 406/74 |
| 4,620,577 | 11/1986 | Nordanswan | 144/98 |
| 4,820,086 | 4/1989 | Kieronski | 406/112 |

FOREIGN PATENT DOCUMENTS

| | | |
|---|---|---|
| 0045625 | 2/1982 | European Pat. Off. . |
| 1212885 | 4/1964 | Fed. Rep. of Germany ........ 406/83 |
| 1481428 | 1/1969 | Fed. Rep. of Germany . |
| 152319 | 11/1981 | Fed. Rep. of Germany ...... 406/188 |
| 999621 | 7/1965 | United Kingdom ................ 406/190 |

*Primary Examiner*—Sherman D. Basinger
*Attorney, Agent, or Firm*—Shefte, Pinckney & Sawyer

[57] ABSTRACT

Apparatus for conveying material between two terminals using a reversible blower system that conveys a carrier member through a tube by suction from one terminal to an intermediate location and by pneumatic pressure from the intermediate location to the other terminal, and vice versa. The carrier member is gradually retarded and stopped at each terminal by a yieldable plate inclined into the path of the carrier member with a yieldable latching element urging the plate inwardly and also serving to latch the carrier member in its ultimate terminal position. The tube has separately manipulatable, open-ended, end portions in which the carrier member is retained for manipulation into position for receiving or discharging its contents. Covers on the carrier member are automatically removed and replaced at each terminal by radially movable latching elements on the cover that are manipulated by an axially movable central unlatching element. The carrier member has annular projections for sealing engagement of the tube. Each projection has an outwardly facing groove in which a compressible sealing strip is retained with a foamed elastomeric base strip behind the sealing strip to deflect the sealing strip outwardly into sealing disposition.

40 Claims, 18 Drawing Sheets

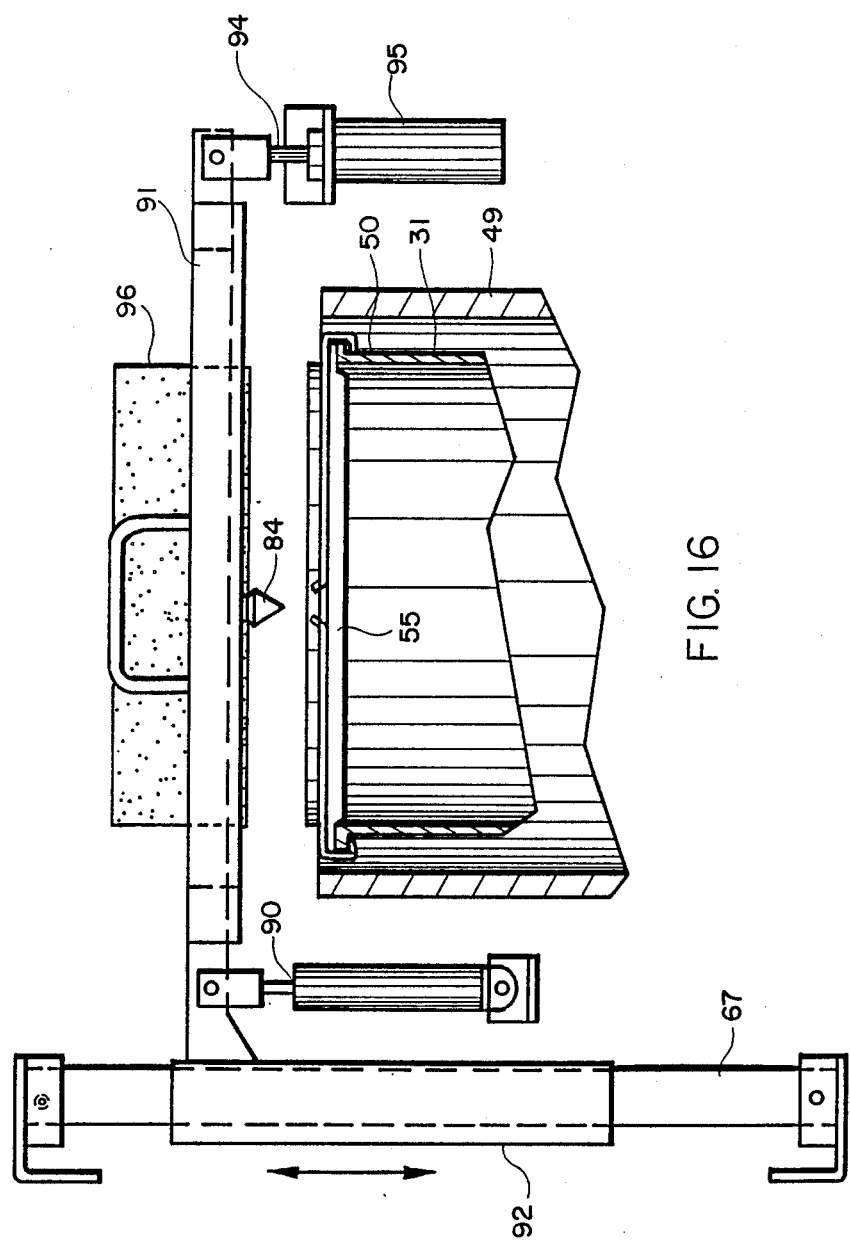

APPARATUS FOR CONVEYING MATERIAL

CROSS-REFERENCES FOR RELATED APPLICATIONS

The present application is a continuation-in-part of co-pending U.S. patent application Ser. No. 00,876 filed Jan. 6, 1987, for METHOD AND APPARATUS FOR PROPELLING A CARRIER ALONG A PNEUMATIC TUBE and now abandoned.

BACKGROUND OF THE INVENTION

The present invention relates to an apparatus for conveying material, and more particularly to an apparatus for conveying material by propelling a carrier member along a tube between terminals and automatically manipulating the carrier member at the terminals for receiving and discharging material.

There are numerous prior art conveying systems that operate to propel a carrier member through a tube, many of which use pneumatic propulsion. For example, systems of this type are used by financial institutions for handling transactions between outside customers in automobiles and inside tellers. However, such systems utilize complex or multiple propulsion means and require attendants for operation, not being automatic as would be desired in many material conveying applications.

One application that the prior systems are not satisfactorily adaptable to is the automatic delivery of mail, newspapers, packages or other similar articles from an exterior receiving terminal, such as a mailbox location, to a delivery terminal inside a residence or other type of building, where the presence of an attendant is not practical or is inefficient. There are other applications wherein unattended automatic operation would be desirable and to which the prior art systems are not adaptable.

SUMMARY OF THE INVENTION

By the present invention, an apparatus for conveying material is provided that is capable of reliable automatic operation without requiring attendants and provides a simple pneumatic propulsion system and unique means for manipulating the carrier member at the terminals of the system for reliable and efficient automatic operation.

According to one feature of the present invention, an apparatus is provided for propelling a carrier member along a pneumatic conveyor tube between two spaced-apart terminals using a blower having a suction intake and a blower output. Conduit means interconnect the blower to the pneumatic tube at two spaced-apart junctions with means for sensing the presence of the carrier member in the pneumatic tube intermediate the junctions. A first valve means alternatively connects the blower intake and output through the conduit means to the tube for alternatively creating carrier member propelling suction through one of the junctions for propelling the carrier member from the terminal beyond the other junction through the tube past that other junction and creating carrier member propelling pressure in the tube through that other junction upon the sensing means sensing the presence of the carrier member in the tube intermediate the junctions for propelling the carrier member to the other of the terminals. A second valve means is provided in the conduit means for reversing the connection of the blower intake and output to the junctions for propelling the carrier member from the other terminal to the one terminal. Preferably, the first valve means reversely alternatively connects the blower intake and output through the other junction and the one junction during reversing by the second valve means.

With the apparatus as described, only a single blower need be used in combination with the two valve means to provide propulsion for travel of the carrier member in both directions through the tube.

According to another feature of the present invention, the apparatus provides for conveying material from one terminal to another using a hollow carrier member containing material and having at least one end with a removable cover thereover. A conveyor tube extends between the terminals for conveyance of the carrier member therethrough by conveying means. The tube has a separately manipulatable, open-ended, end portion at at least one terminal for receipt and temporary retention of the carrier member therein with the end of the carrier member outermost. Means are provided for releasably retaining the carrier member in the end portion and means are also provided for removing and replacing the end cover while the carrier member is retained. The end portion is manipulatable with the carrier member retained therein from alignment with the tube for receipt and discharge of the carrier member to a position out of alignment with the tube for transfer of material through the carrier member end. Preferably, the position of the tube end out of alignment with the tube at one terminal is in an inclined position with the carrier member end uppermost for receiving material. At the other terminal the end portion and carrier member are inverted with the carrier member end lowermost for discharge of material therefrom.

According to a further feature, the means for removing and replacing the end cover includes yieldable latching elements on the cover latchingly engagable with the carrier member, and an unlatching element engagable with the latching elements to unlatch the elements from the carrier member and to support the cover separate from the carrier member. Preferably the latching elements are radially yieldable outwardly and the unlatching element is centrally located. In the preferred embodiment, the carrier member is formed with a radially projecting flange corresponding with each latching element, and each latching element includes in inturned outer end engagable under the flange to latch the cover to the carrier member and movable out of flange engagement upon the unlatching element engaging the latching elements. Spring means mounted on the cover are in engagement with the latching elements to normally urge them into latching engagement with the cover. Preferably, the unlatching element is axially movable and has a portion of increasing radial extent for moving the latching elements radially to unlatch the cover and has a portion of reduced radial extent beyond the increasing radial extent portion for cover supporting engagement of the latching elements while maintaining the latching elements unlatched from the carrier member. The increasing radial extent is in the form of an inverted cone and the reduced radial extent portion is in the form of an annular recess. A centering aperture is formed in the cover in alignment with the unlatching element for engagement therewith to maintain the unlatching element axially positioned during support of the cover. The end cover includes means operable to retain the cover on the carrier member while the unlatching element is removed from engagement with the latching elements to permit the latching elements to return to engagement with the carrier member to latch the cover on the carrier member.

The foregoing cover removing and replacing feature is particularly applicable to an automatic system as the cover can be removed and replaced and the carrier member positioned for receiving or discharging contents automatically without requiring manual manipulation.

According to another feature of the present invention, means are provided at at least one terminal for gradually retarding movement of the carrier member. This includes a carrier member engaging element movable laterally inwardly of the tube into the path of the carrier member and having a carrier member engaging surface extending longitudinally within the tube. Means yieldably urge the carrier member engaging element inwardly for engagement of the carrier member to gradually retard the carrier member as it advances along the surface. Preferably, means are provided for sensing the presence of the carrier member at the end of the tube and means are responsive to sensing of the carrier member for retracting the carrier member engaging element from the path of the carrier member to allow the pneumatic conveying means to move the carrier member in the tube. In the preferred embodiment, the carrier member engaging element is disposed for retarding and stopping the carrier member at a spacing from a position at the terminal and the retracting means retracts the element to allow the pneumatic conveying means to convey the carrier member to the terminal position. In the preferred embodiment a latching element is engagable with the carrier member engaging element and is extendable into latching engagement with the carrier upon release of the retracting means to latch the carrier member in its terminal position. This is preferably accomplished by using a carrier member having an outer annular projection that is engagable with the carrier member engaging surface and is also engaged by the latching element. In the preferred embodiment the carrier member engaging element is pivotally mounted for yieldable disposition at an inclination to the path of the carrier member and is arcuately shaped in general correspondence with the shape of a cylindrical conveying tube.

This feature of gradually retarding and stopping the carrier member avoids the undesirable impact of the carrier member against a stop and thereby avoids the resulting noise and damage that could otherwise occur.

According to a further feature of the present invention, the conveyor tube has a generally upwardly facing end at at least one terminal and means are provided for releasably retaining the carrier member at the upwardly facing tube end against downward movement into the tube without preventing upward movement of the carrier member. The means for conveying the carrier member through the tube is operable as well to raise a carrier member of limited weight from the retaining means while being inoperable to raise a carrier member heavier than the limited weight. Means are provided for sensing the raising of a carrier member and the releasably retaining means is operable in response to the sensing of the raising of the carrier member to release the carrier member for downward movement into and through the tube, but when an overweight carrier member is not raised and, therefore, is not sensed, the retaining means is not retracted and the carrier member remains at the terminal.

This feature eliminates release of an overweight carrier member into the conveyor tube when the conveying means may not be powerful enough to propel the carrier member to the other terminal position. As conveyor tubes normally are arranged with their end portions elevated, it is important that an overweight carrier member not be allowed to fall into the tube when the pneumatic power of the conveying means is not of sufficient to raise the carrier member to the terminal positions, as extracting a carrier member from within the tube would be difficult, time consuming and costly.

For enhanced sealing and wear of the carrier member during conveyance through the tube, a sealing assembly is preferably provided in an annular projection on the carrier member. This sealing assembly includes an outwardly facing annular groove having a central annular recess and opposed annular side recesses. A compressible sealing strip is retained in and projects from the groove and has edge portions retainingly seated in the side recesses. An annular base strip is seated behind the sealing strip in the central recess and projects outwardly of the central recessfor outward deflection of the sealing strip. Preferably, the base strip isresilient for urging the sealing strip outwardly, with the sealing strip being made of felt material and the base strip being made of foamed elastomeric material.

Other and further features and advantages of the present invention will be apparent from the accompanying drawings and the following detailed description of the preferred embodiment.

BRIEF DESCRIPTION OF THE DRAWINGS

FIG. 16 is an elevational view, partially in section, of selected components of the apparatus in the interior terminal;

DETAILED DESCRIPTION OF THE PREFERRED EMBODIMENT

Figure 1:
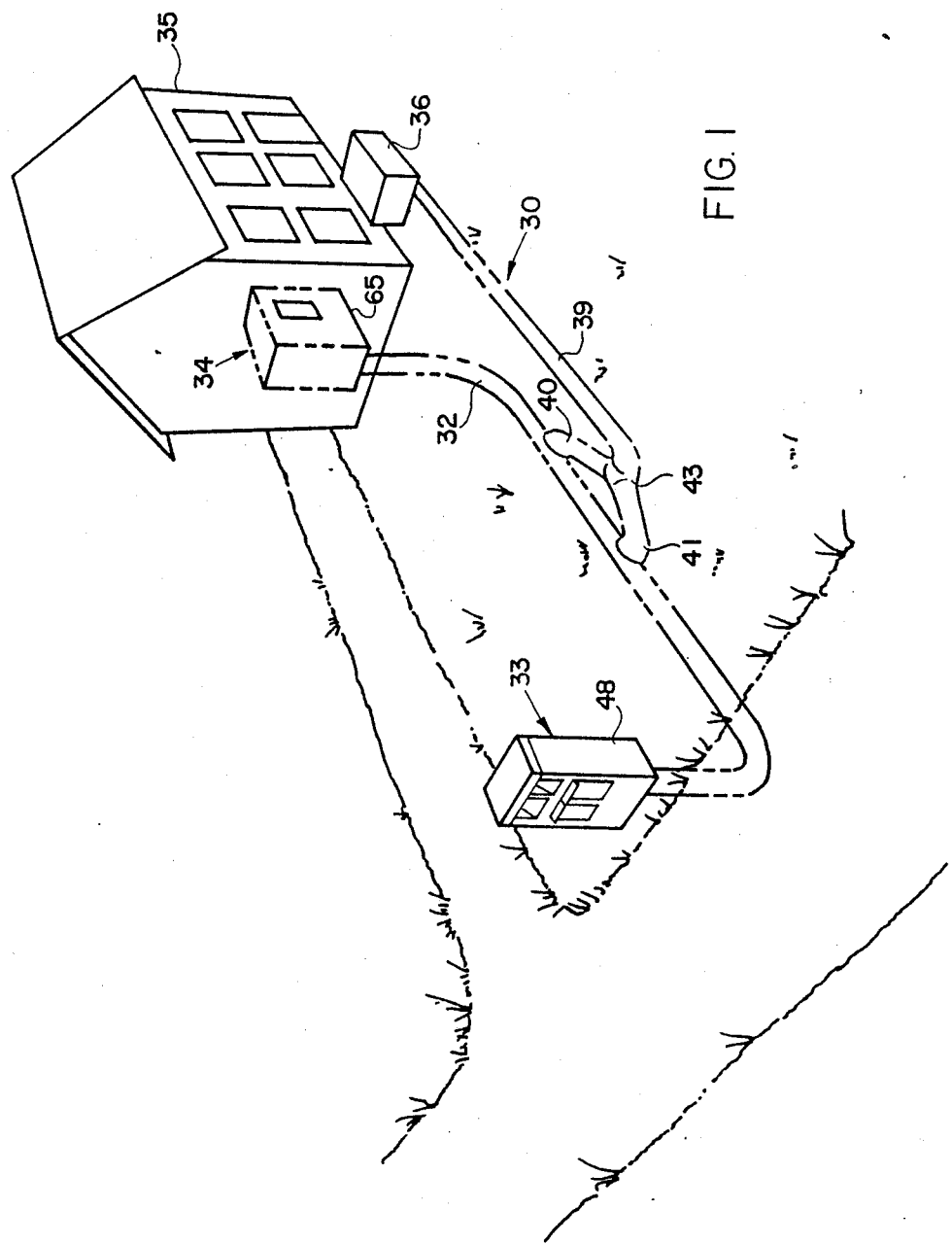
FIG. 1 is a schematic illustration of an apparatus according to the preferred embodiment of the present invention installed in relation to a residence.

Referring first to FIGS. 1 and 2, an apparatus 30 is illustrated for propelling a carrier member 31 along a pneumatic conveyor tube 32 between two spaced-apart terminals, one of the terminals being an exterior terminal 33 and the other being an interior terminal inside a building 35, such as a residence. The present invention is applicable to various types of installations where it is desirable to convey material from one terminal to another. However, in the preferred embodiment illustrated and described herein the apparatus is adapted for use in automatically conveying mail, newspapers, packages and other articles from an exterior terminal 33 easily accessible for a mailman or delivery man to an interior terminal 34 where the articles can be discharged automatically without attendance by someone within the house 35 and the carrier member 31 will be automatically returned to the exterior terminal 33 in readiness for the next delivery or to deliver an article from the interior of the building 35 to the exterior terminal 33 for subsequent pickup by a mailman or delivery man.

The carrier member 31 is propelled or conveyed through the conveyor tube 32 by alternate suction and blowing generated by a blower 36 having a suction intake 37 and a blower output 38. Conduit means 39 connect the intake 37 and output 38 of the blower 36 with the tube 32 at two spaced-apart junctions 40, 41 intermediate the terminals 33, 34. Sensing means in the form of a conventional feeler switch or photoelectric sensor is located in the tube 32 between the junctions 40, 41 at a location such as indicated by the arrow 42, for sensing the presence of a carrier member 31 thereat.

A first valve means 43 connects the blower intake 37 and output 38 through the conduit means 39 to the tube 32 and is alternatively operable to either create carrier member propelling suction through one of the junctions 40 for propelling the carrier member 31 from the terminal 33 beyond the other junction 41 through the tube 32 past the other junction 41 and creating carrier member propelling pressure in the tube 32 through the other junction 41 upon the sensing means 42 sensing the presence of the carrier member 31 in the tube 32 intermediate the junctions for propelling the carrier member 31 to the other of the terminals 34. This first valve means 43 is in the form of a flap valve alternatively closing the conduit leading to either one of the junctions 40, 41.

A second valve means is disposed in the conduit means 39 for reversing the connection of the blower intake 37 and output 38 to the junctions 40, 41 for propelling the carrier member from the other terminal 34 to the one terminal 33. This second valve means includes two valves 44, 45. The first of these 44 is connected to the blower intake 37 and is a flap valve alternately positioned to close an opening to the atmosphere and to open the conduit means 39 for flow of air from the tube 32 to the blower 36, and to close the conduit means 39 and open to the atmosphere for drawing air from the atmosphere to the blower 36. The other valve 45 is also a flap valve that either closes an opening to the atmosphere or closes the conduit means 39 for alternative discharge of air from the blower output 38 to the atmosphere or into the conduit means 39 to the tube 32.

The sequence of operation in propelling a carrier member 31 between the terminals 33, 34 is illustrated in FIGS. 2 A-D. As seen in FIG. 2A, a carrier member 31 is being drawn by suction from the exterior terminal 33, which suction is being generated by the blower 36. In this stage of operation, the valve 44 closes the conduit means 39 to the atmosphere and opens it to the first valve 43, which is in a position opening to the junction 40 farthest from the exterior terminal 33, thus drawing suction from the carrier member 31 through the tube and intermediate portion of the tube to the junction 40. While this is occurring, a closure plate 46 at the end of the tube 32 in the interior terminal 34 seals the end of the tube so that the suction is confined to action on the carrier member 31. Also, during this suction, the other valve 45 of the second valve means is positioned to open the blower output 38 to the atmosphere.

Figure 2A:
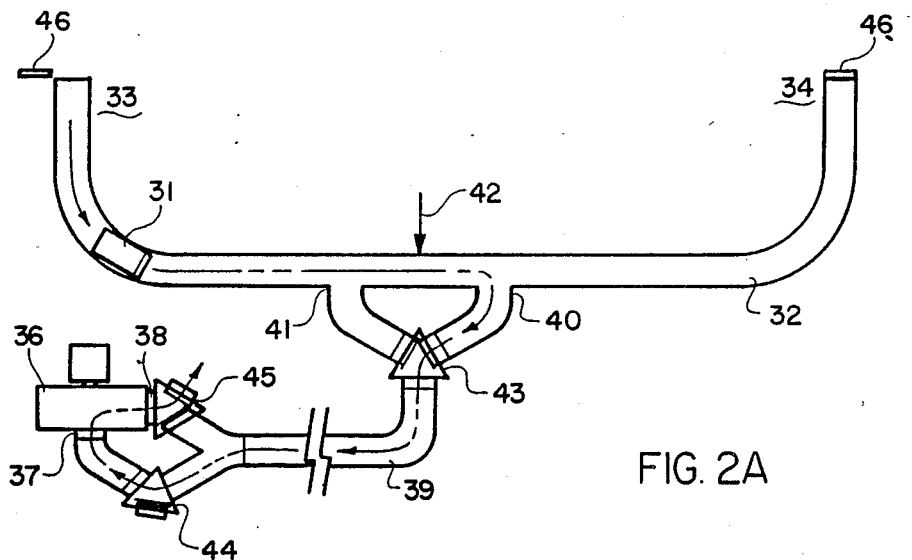
FIGS. 2 A-D are schematic diagrams of the sequence of operation of the propelling apparatus of the preferred embodiment of the present invention.
Figure 2B:
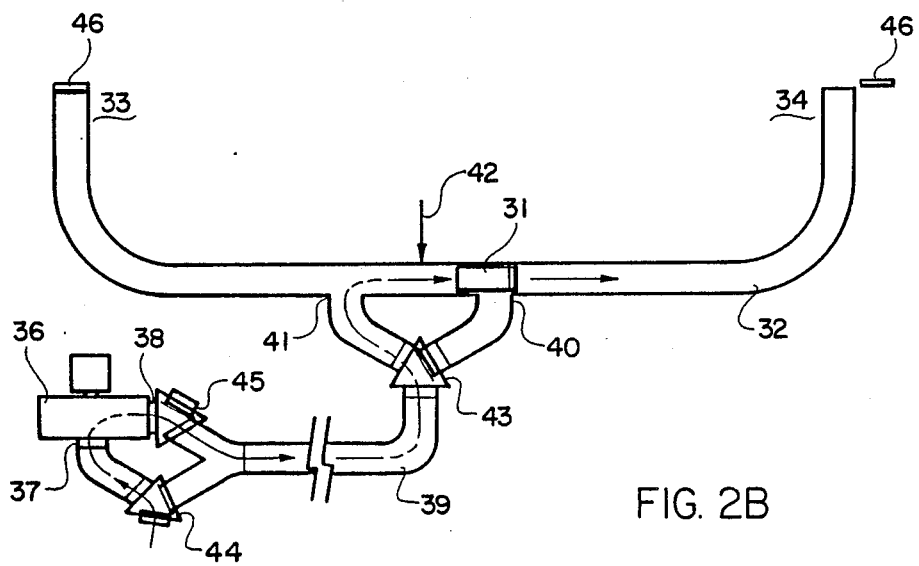

When the carrier member 31 has been pulled by suction to a location between the junctions 40, 41 it will cause the sensing means 42 to sense the presence of the carrier member 31 and activate the valves 43, 44 and 45, switching the first valve 43 to close the conduit means 39 to the junction 40 and open it to the junction 41 behind the path of travel of the carrier member, and to manipulate the valve 44 to close the conduit means 39 and open the blower intake 37 to the atmosphere. The other valve 45 is manipulated to close the blower output to the atmosphere and open it to the conduit means 39. The closure plate 46 at the interior terminal 34 is opened to relieve pressure in advance of the carrier member 31 and a similar closure plate 47 at the exterior terminal 33 is closed to prevent exhaust through the tube behind the carrier member 31. In this condition, as illustrated in FIG. 2B, the pressure from the blower 36 is directed behind the carrier member 31 and delivers it to the interior terminal 34.

Figure 2C:
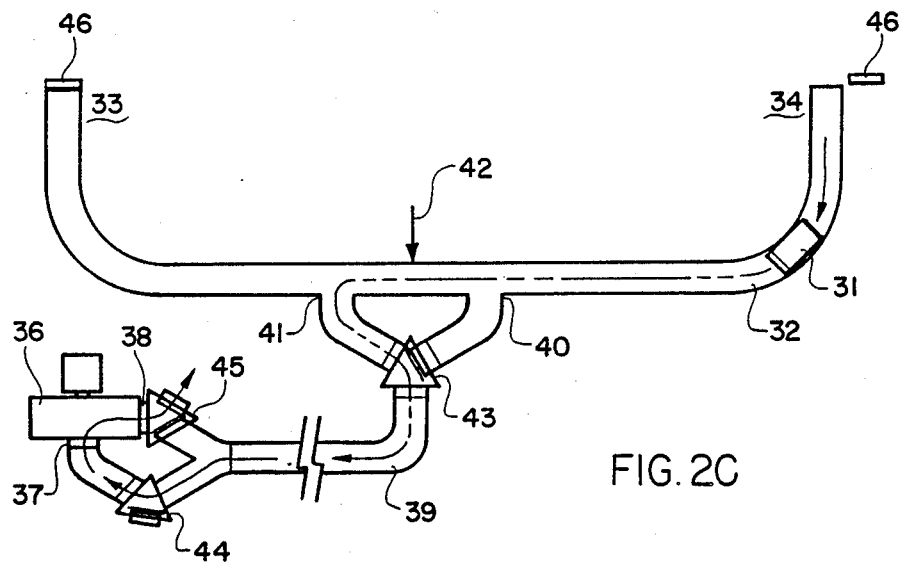
Figure 2D:
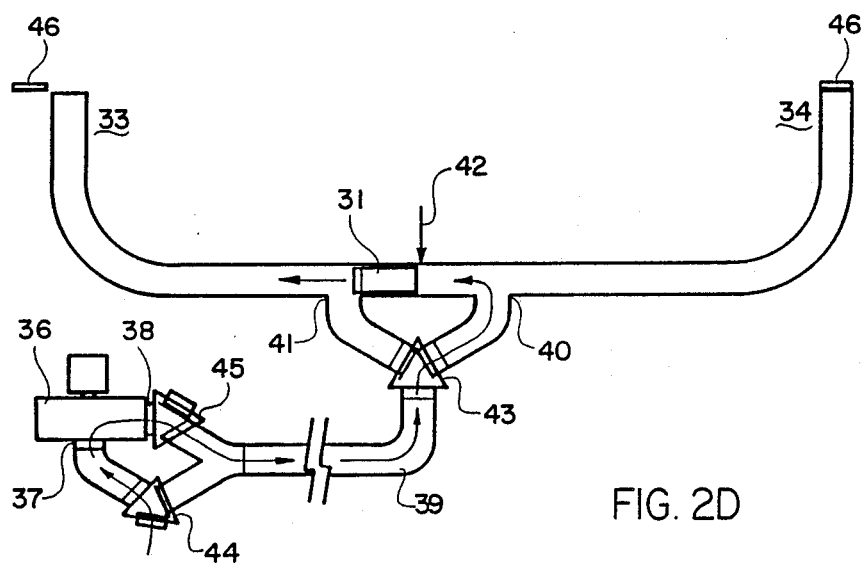
Figure 3:
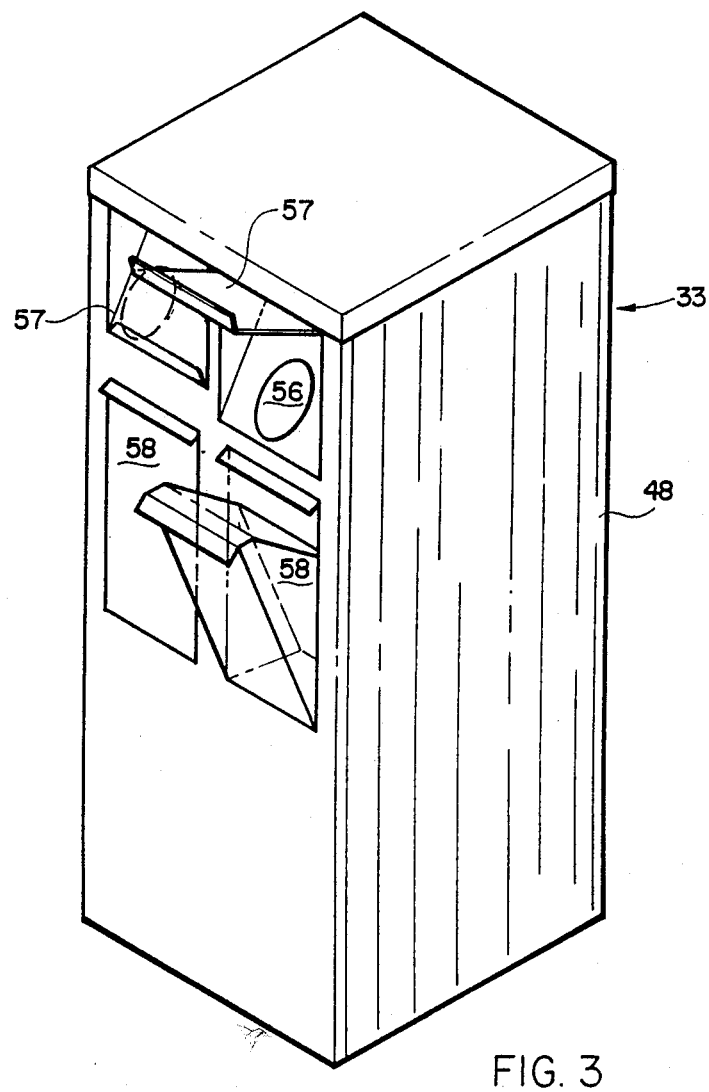
FIG. 3 is a perspective view of the exterior terminal of the apparatus of FIG. 1.
Figure 4:
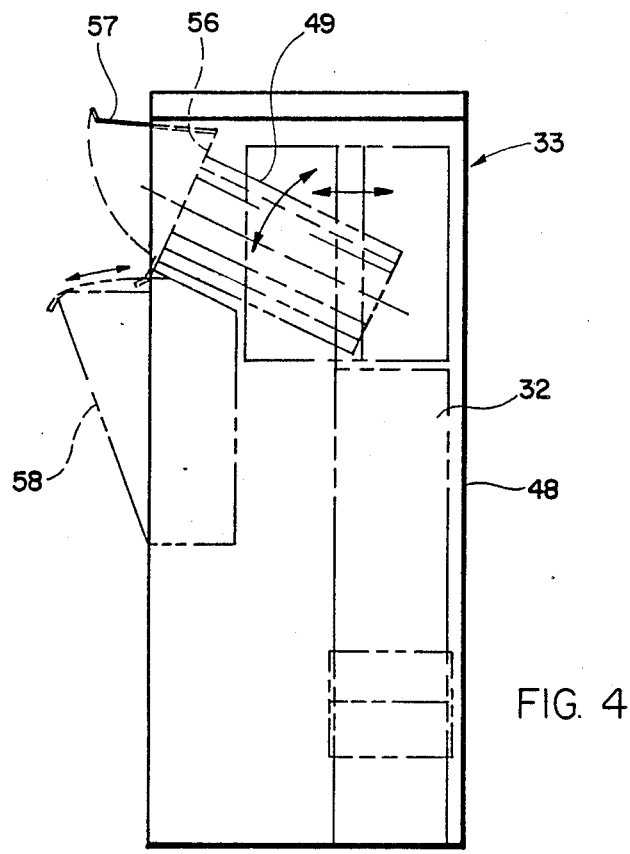
FIG. 4 is a side elevation of the exterior terminal of FIG. 3.

After the contents of the carrier member 31 has been discharged at the interior terminal 34, as will be described in more detail below, the operation is reversed as indicated in FIG. 2C. The valves 44 and 45 are reversed to open the blower output 38 to the atmosphere and connect the blower intake 37 to the conduit means 39 and to the tube 32 through the junction 41 to pull by suction the carrier member 31 through the tube 32 into a location between the junctions 40, 41 where its presence is sensed by the sensing means 42 that activates the valves 43, 44 and 45, as illustrated in FIG. 2D, to open the blower intake 37 to the atmosphere, connect the blower output 38 to the conduit means 39 with the first valve 43 shifted to connect the blower output to the tube 32 through the junction 41. At this time the closure plate 46 at the interior terminal 34 is opened and the closure plate 47 at the exterior terminal 33 is opened. In this condition, the output of the blower 36 is directed at the carrier member 31 to propel it by pressure to the exterior terminal 33, where it is positioned for receipt of articles for a subsequent delivery, as will be described in detail below.

The exterior terminal 33 is illustrated in FIGS. 3-7. It includes a housing 48 into which the tube 32 extends from underground to an upstanding vertical end at which an end portion 49 of the tube 32 is disposed. This end portion 49 is separately manipulatable and open-ended for receipt and temporary retention of a carrier member 31 with an end 50 of the carrier member uppermost. The aforementioned closure plate 47 is disposed for horizontal pivoting under the end portion 49 of the tube over the adjacent tube end selectively as described above in regard to the sequence of propulsion of the carrier member 31 through the tube 32. For this purpose, the closure plate 47 is pivoted on a vertical shaft 51 on which the aforementioned end portion 49 of the tube is also pivoted. Pivoting of the end portion 49 is accomplished by a piston-cylinder mechanism 52 connected to a bracket 53 projecting from the end portion 49 so that upon extension and retraction of the piston-cylinder 52 the end portion 49 will be manipulated from a position in alignment with the tube 32 into a receiving position.

Figure 6:
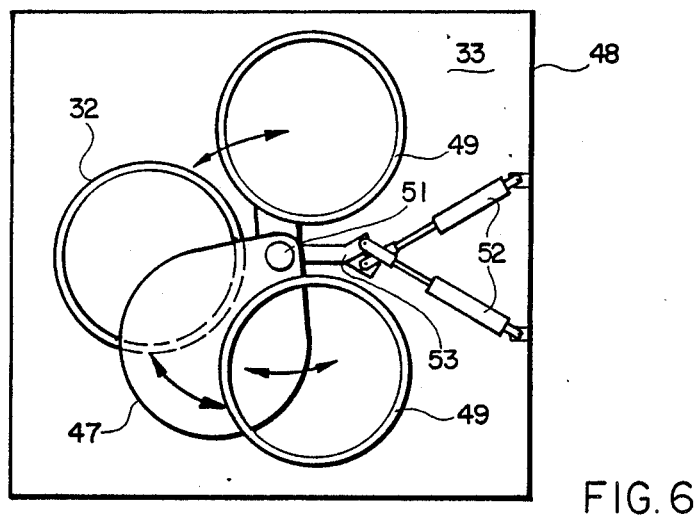
FIG. 6 is a plan view of the inside of the exterior terminal of FIG. 4.
Figure 5:
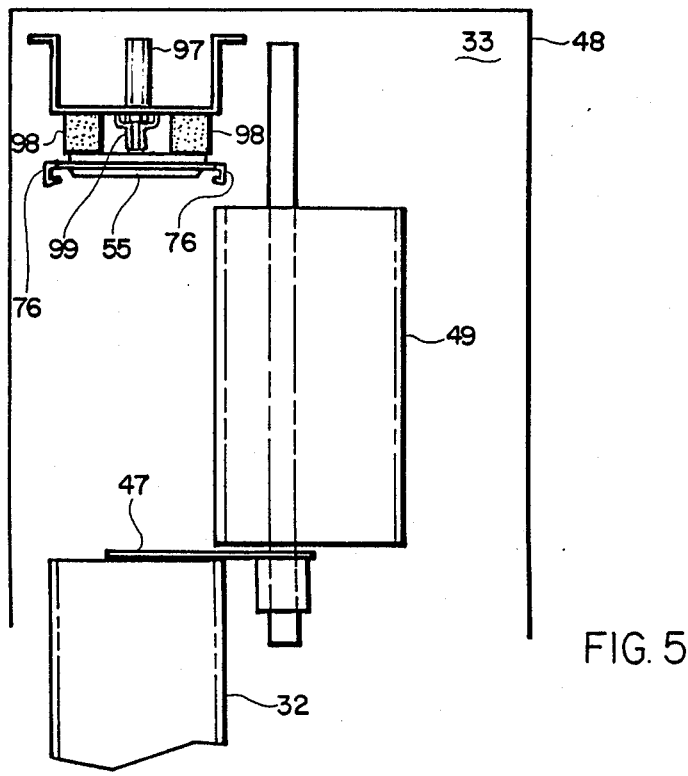
FIG. 5 is an elevational view of the inside of the exterior terminal of FIG. 4.

As seen in FIG. 6, there are two end portions 49 and two piston-cylinder mechanisms 52 and brackets 53, so that either one of the end portions 49 can be positioned in alignment with the tube 32. One of these end portions 49 is for handling articles of mail and the other is for handling newspapers, delivering packages and other articles.

Each end portion 49 is manipulatable from alignment with the tube 32 to a position out of alignment (FIG. 7) for transfer of material to the carrier member 31, for which purpose the ends 50 of the carrier member 31 are formed with covers 55, with the material to be transferred being insertable through an end 50 of the carrier member when the cover 55 is removed. In the receiving position illustrated in FIG. 7, the end portion 49 of the tube and the carrier member 31 are inclined with the open end 50 of the carrier member uppermost. This open end 50 faces an opening 56 recessed in the housing 48 (FIG. 3) over which a cover 57 is pivoted and below which a pivoted bin 58 is mounted in the housing 48 for receipt of material or articles that are too large or too heavy for handling in the carrier member 31. There are two adjacent openings 56, covers 57 and bins 58, one set being associated with each of the tube end portions 49.

Figure 7:
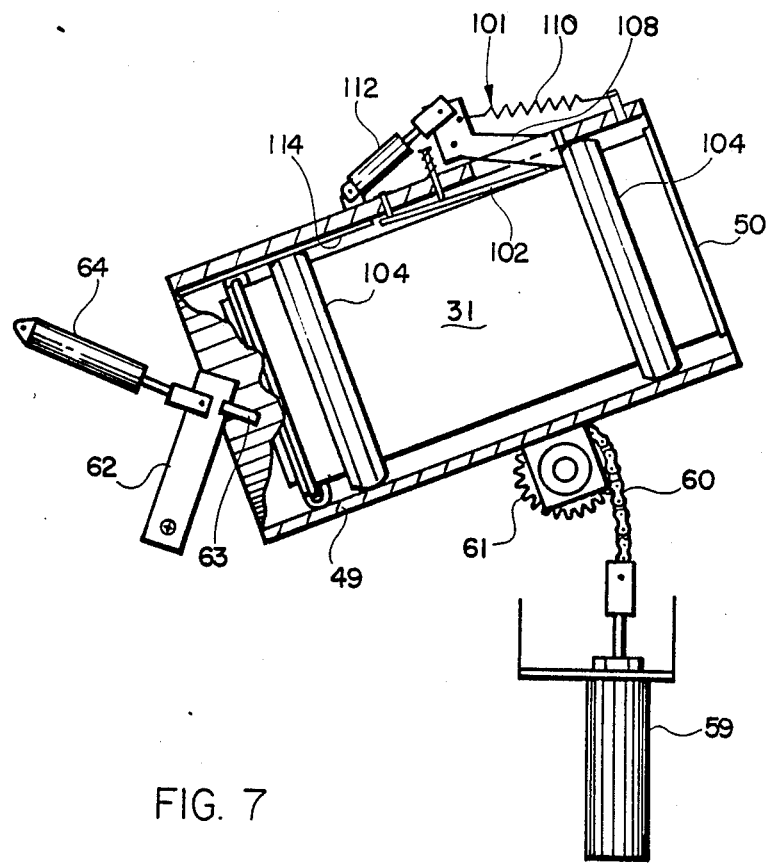
FIG. 7 is an elevational view, partially in section, of a portion of the apparatus inside the exterior terminal of FIGS. 4-6.

As seen in FIG. 7, the end portion 49 is tilted by a vertically disposed piston-cylinder mechanism 59 to which a chain 60 extends to a sprocket 61 mounted on the side of the end portion 49. The end portion 49 is retained in its inclined position by a pivoted retaining finger 62 engagable behind a tab 63 projecting from the side of the end portion 49, with the retaining finger 62 being manipulated by a piston-cylinder mechanism for retaining and releasing the end portion 49. The carrier member 31 is retained in the end portion 49 with the end cover 55 removed as will be described in detail below.

Figure 8:
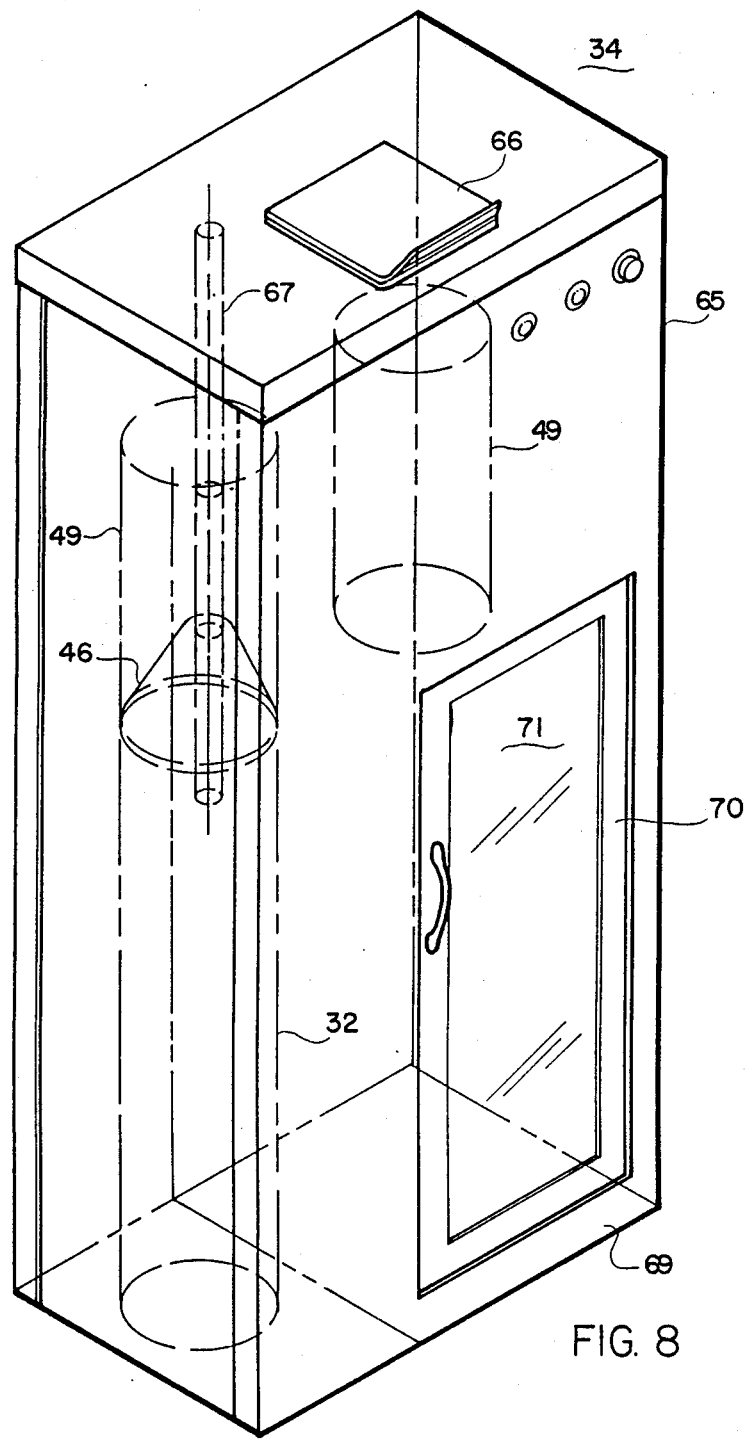
FIG. 8 is a perspective view of the interior terminal of the apparatus of FIG. 1.
Figure 10:
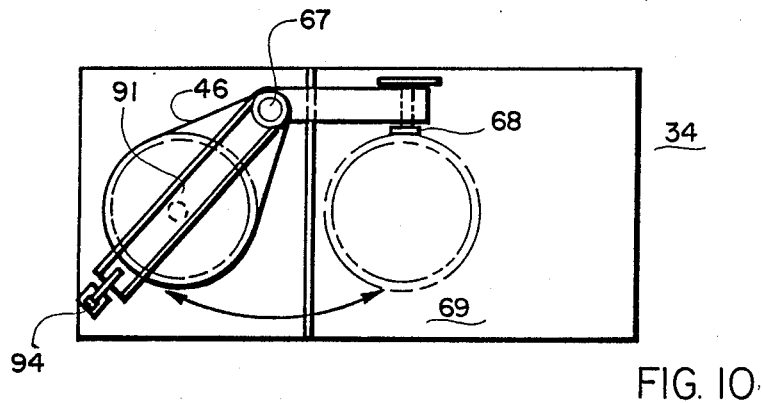
FIG. 10 is a plan view of the inside of the interior terminal of FIG. 8.
Figure 9:
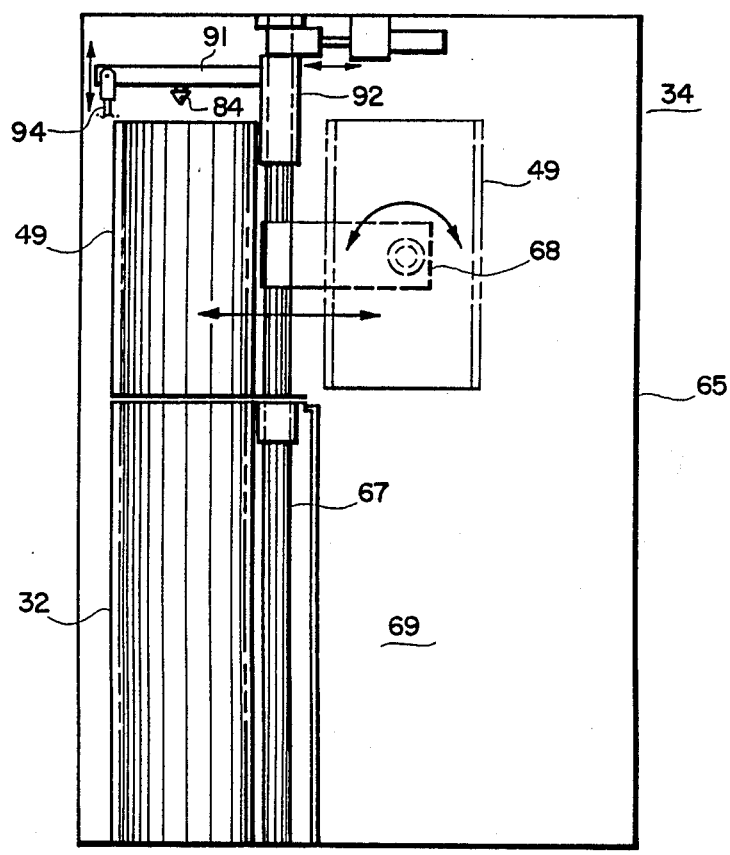
FIG. 9 is an elevational view of the inside of the interior terminal of FIG. 8.

The interior terminal 34 is illustrated in FIGS. 8-10. This interior terminal 34 includes a housing 65 into which the tube 32 projects from underground with an upstanding end above which is an end portion 49 similar to the end portion in the exterior terminal 33 as described above. This end portion 49 in the interior terminal 34 is pivotally mounted on a vertical shaft 67 for movement from alignment with the tube 32 to a discharge position in which it is inverted by an inverting mechanism 68 of conventional design to invert the carrier member 31 with an open end portion 50 facing downward with its cover 55 removed so as to discharge material conveyed therein into the chamber 69 of the housing 65 therebelow. Access to the chamber 69 for removal of the discharged material is gained through a door 70 formed in the housing 65, with the door having a transparent panel 71 so that an observer can determine whether there are contents to be removed.

The housing 65 has a top opening with a cover 66 for access to place articles in the carrier member for delivery of articles, such as mail to be sent, from the interior terminal 34 to the exterior terminal 33.

The end covers 55 of the carrier member 31 are retained in place during conveyance of the carrier member 31 through the tube 32, and means are provided for removing and replacing the outwardly positioned end cover 55 at each of the exterior and interior terminals 33, 34. For this purpose, each cover 55 is formed with an inner circular plate 72 and an outer circular plate 73 (FIGS. 17-21). The inner plate 72 fits within the end of the carrier member 31 and has a radially projecting annular flange 74 of a radial extent corresponding to that of an outwardly projecting radial flange 75 on the end of the carrier member 31. Latching elements 76 in the form of flat strips, are mounted in the cover 55 and are latchingly engagable with the carrier 31. These strips 76 are radially yieldable outwardly, for which purpose they are slidable in radial slots 77 formed in the inner plate 72 facing the outer plate 73. In the embodiment illustrated there are three equally spaced slots 77 and strips 76. The strips 76 are normally urged inwardly by compression springs 78 mounted in recesses 79 in the inner plate 72 below the strips 76. The springs are retained at their outer ends against the outer ends of the recesses 79 and at their inner ends against tabs 80 projecting from the strips 76 into the recesses 79.

The strips 76 have inturned outer ends 81 that are engagable under the flange 75 of the carrier member 31 with the flange 74 of the inner plate 72 therebetween. The urging of the springs 78, therefore, retain the inturned ends 81 of the strips 76 in latching position to retain the cover 55 on the carrier member 31.

The inner ends 82 of the strips 76 extend into a central opening 83 in the outer plate 73. These inner ends 82 are inclined toward the outer surface of the outer plate 73 and in their latching position (FIGS. 18 and 19) they are spaced from each other for engagement by an unlatching element 84 (FIGS. 20 and 21) for unlatching of the cover 55 from the carrier member 31 and support of the cover 55 on the unlatching element 84.

The unlatching element 84 is centrally located with respect to the carrier member 31 and cover 55 and is movable axially into engagement with the latching elements 76.

Figure 20:
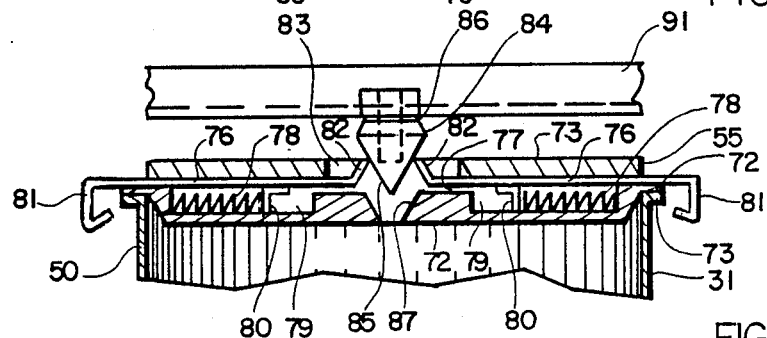
Figure 21:
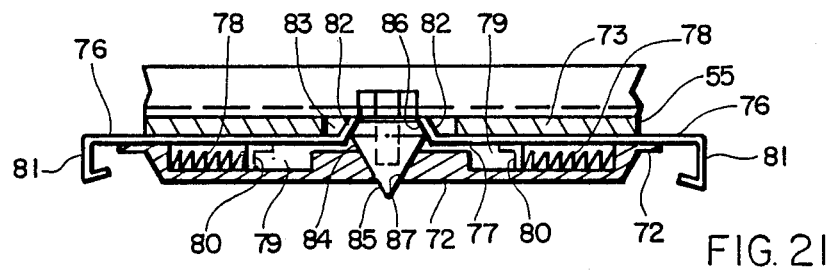

The unlatching element 84 is pointed in the shape of an inverted cone 85 insertable between the inner ends 82 of the latching elements 76 for engagement therewith and forcing the latching elements 76 radially outward. The extent of the inverted cone shape 85 is such that the latching elements 76 will be forced out sufficiently to move the outer ends 81 out of engagement with the flange 75 on the carrier member 31, thereby unlatching the cover 55 from the carrier member 31 (FIG. 20). The unlatching element 84 has an annular recess 86 formed beyond the inverted cone 85 so that upon further axial movement of the unlatching element 84 the inner ends 82 of the latching elements 76 will move inwardly into the annular recess 86 for support of the cover 55 thereon (FIG. 21) separate from the carrier member 31 under the urging of the springs 78. To maintain the cover 55 centered on the unlatching element 84 and to maintain full cover supporting engagement of the inner ends 82 of the latching elements 76 by the unlatching element 84, the inner circular plate 72 is formed with a centering aperture 87 in axial alignment with the unlatching element 84 and having an inverted cone shape corresponding with the shape of the unlatching element 84. Thus, when the unlatching element 84 is inserted into the cover 55, the inverted cone shape 85 of the unlatching element 84 will seat in the centering aperture 87.

Figure 12:
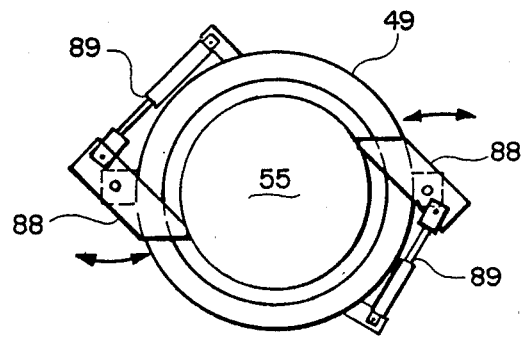
FIG. 12 is a plan view of a portion of the apparatus inside the terminal of FIGS. 8-11.
Figure 11:
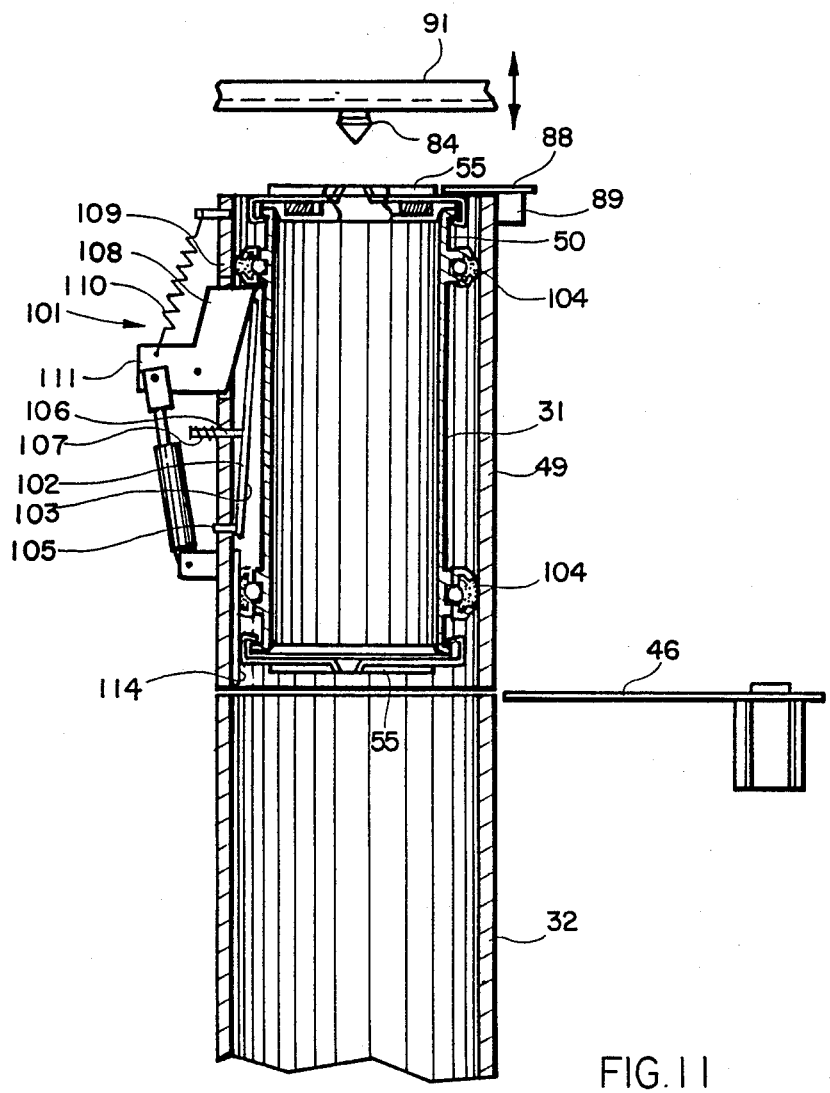
FIG. 11 is a vertical sectional view of a portion of the inside of the interior terminal of FIGS. 8-10.
Figure 15:
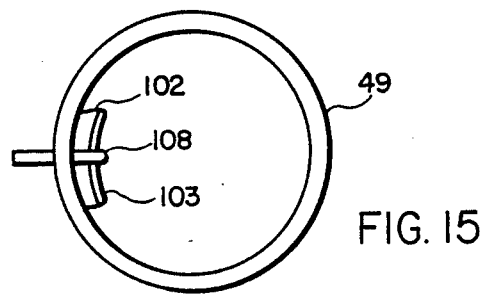
FIG. 15 is a top plan view of the elements illustrated in FIG. 14.
Figure 13:
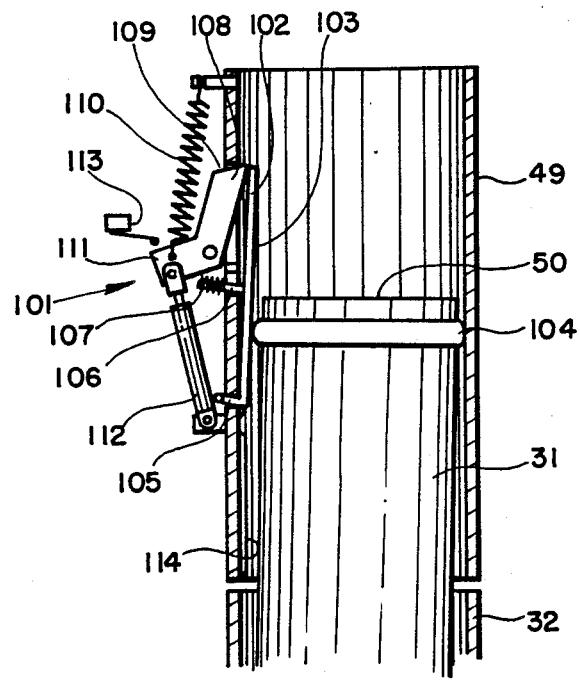
FIG. 13 is a vertical sectional view of the carrier member retarding and stopping means of the preferred embodiment of the apparatus of the present invention.
Figure 14:
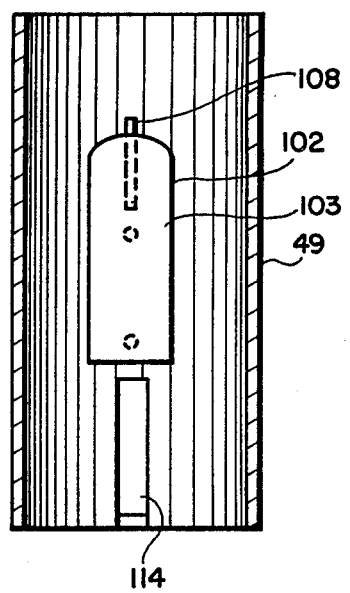
FIG. 14 is a vertical sectional view as viewed at right angles to the illustration of FIG. 13.
Figure 17:
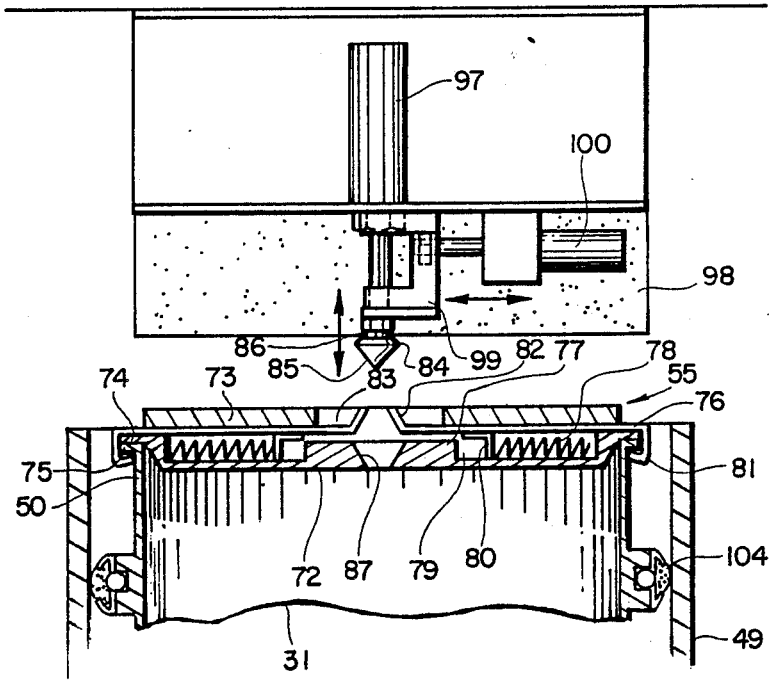
FIG. 17 is an elevational view, partially in section, of selected components of the apparatus in the exterior terminal.
Figure 18:
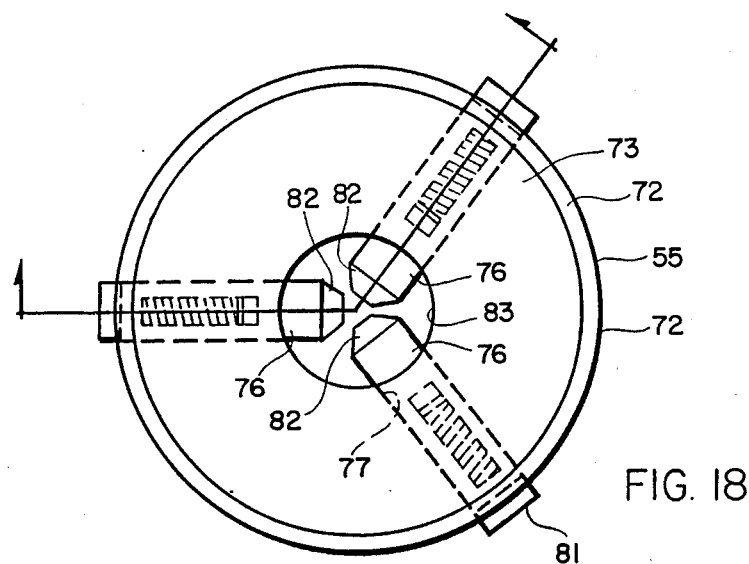
FIG. 18 is a top plan view of the carrier member cover of the preferred embodiment of the present invention.
Figure 19:
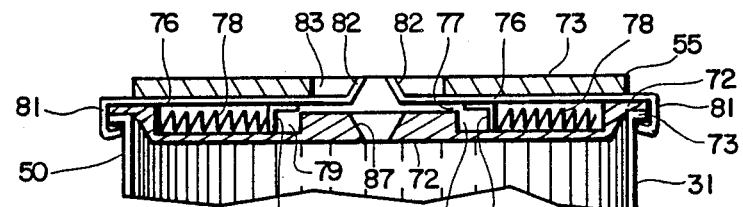
FIGS. 19, 20 and 21 are vertical sectional views of the cover of FIG. 18 shown in relation to the carrier member and being manipulated by the unlatching element.

To replace the cover 55 on the carrier member 31, the unlatching element 84 is axially removed from engagement with the latching element 76, thereby allowing the latching elements 76 to move radially inwardly under the bias of the springs 78 so that the inturned outer ends 81 of the latching elements 76 again engage under the annular flange 75 of the carrier member 31. During this removal of the unlatching element 84, the cover 55 is temporarily retained in place on the carrier member 31 by a pair of flat fingers 88 mounted in diametric opposition at the outer end of the end portion 49 of the tube 32 and manipulated by piston-cylinder mechanisms 89 to move from positions over the covers 55 (FIGS. 11 and 12) to positions out of interference with removal of the cover.

The fingers 88 also are operable during inverting of the carrier member 31 at the interior terminal 34 as described above. For this purpose the piston-cylinder mechanisms 89 are actuated after the cover 55 has been removed, causing the fingers 88 to move inwardly over the open outer end 50 of the carrier member. The fingers 88 thereby retain the carrier member 31 in the tube end portion 49 as it is inverted to discharge the contents of the carrier member into the bin 69. Then, when the tube end portion 49 returns to an upright position, the piston-cylinder mechanism 89 retracts to move the fingers 88 outwardly to allow replacement of the cover 55 before the fingers 88 again move inwardly over the cover 55 during removal of the unlatching element 84 as described above.

Axial manipulation of the unlatching element 84 at the interior terminal 34 is accomplished, as illustrated in FIG. 16, by a piston-cylinder mechanism 90 connected to a crossbar 91 on which the unlatching element 84 is mounted and projects downwardly in alignment with the cover 55. The crossbar 91 is stabilized to maintain the unlatching element 84 in proper alignment with the cover 55 and to provide smooth movement by mounting of the crossbar 91 at one end on a vertically extending sleeve 92 slidable on the vertical shaft 67. For the same purpose the other end of the crossbar 91 is pivoted to a rod 94 guided in a cylinder 95. The piston-cylinder 90 that manipulates the crossbar 91, causes movement of the unlatching element 94 from an upper retracted position downwardly into engagement with the cover 55 to remove it from the carrier member 31 and to a partially retracted position supporting the cover 55 out of interference with the carrier member 31 and end portion 49 of the tube 32 during manipulation thereof as described above. In its fully retracted position, the crossbar 91 positions the unlatching element 84 upwardly within the vertical extent of a pair of cushion blocks 96 of felt or other compressible material, which serve to stop and cushion the carrier member 31, if necessary, as the carrier member arrives at the terminal.

At the exterior terminal 33, the unlatching element 84 is manipulated by an axially mounted piston-cylinder mechanism 97 (FIG. 17) that manipulates the unlatching element 84 from a retracted position between cushioning blocks 98 to a cover removing position and back to a partially retracted cover supporting position, in which the unlatching element 84 is retained against further retraction by a U-shaped bracket 99 reciprocated radially by piston-cylinder mechanism 100 from a position in engagement with the unlatching element 84 to prevent further retraction of the unlatching element and a position out of interference with the unlatching element 84. With this construction, the U-shaped bracket 99 begins in a retracted position and the unlatching element 84 is also in a retracted position within the axial extent of the cushioning blocks 98 so that when a carrier member 31 arrives at the exterior terminal 33 it can be cushioned against the blocks 98 without contacting the unlatching element. The unlatching element is then manipulated downwardly to remove the cover 55 from the carrier member 31, at which time the U-shaped bracket 99 extends into position for engagement of the unlatching element 34 upon retraction so that the cover 55 is supported in a raised position, with the U-shaped bracket 99 preventing sufficient retraction of the unlatching element 84 that would cause it to disengage from the cover 55 due to the cover being restrained by the cushioning blocks 98.

Means are provided in the end portion 49 of the conveyor tube 32 for gradually retarding and stopping movement of the carrier member 31 as it arrives at the terminals under the propulsion of the blower. As seen in FIGS. 7, 11 and 13–15, this means 101 includes a carrier member engaging element 102 in the form of a thin arcuately shaped plate corresponding in general contour to that of the inner surface of the cylindrical tube end portion 49. The plate 102 has an inwardly facing carrier member engaging surface 103 for engagement of an annular projection 104 on the carrier member 31 adjacent its end. There is one of these projections 104 at each end of the carrier member 31 for engagement of the leading projection as the carrier member 31 arrives at either terminal.

The plate 102 extends axially within the tube end portion 49 and is pivoted at its inner end against the tube wall and is retained in its axial disposition by a pin 105 projecting radially outwardly from the plate 103 adjacent its inner end through the wall of the tube end portion 49. The plate 102 is also retained axially by another retaining pin 106 intermediate the ends of the plate 102 and projecting from the plate through the wall of the tube end portion 49.

The plate 102 is normally urged radially outwardly toward the wall of the tube end portion 49 by a compression spring 107 on the intermediately located pin 106 outwardly of the tube end portion. Thus, the plate 102 is laterally movable inwardly into the path of the carrier member 31. For this purpose, means are provided for yieldably urging the plate 102 inwardly in the form of a latching element 108 pivoted on the exterior of the tube end portion 49 and extending through a longitudinal slot 109 in the tube end portion 49 into engagement with the upper end of the plate 102. A tension spring 110 mounted to the tube end portion 49 above the latching element 108 and to an outwardly extending leg 111 of the latching element 108 normally urges the latching element 108 radially inward against the plate 102 to position the plate 102 in the path of the carrier member 31 opposite the urging of the weaker spring 107 on the intermediate pin 106 of the plate 102.

With this construction, when a carrier member 31 is propelled through the tube 32 to the tube end portion 49, the inwardly projecting plate 102 will be in the path of the carrier member and will be engaged by the projection 104 on the carrier member, thereby applying resistance to movement of the carrier member in a gradually decreasing amount as the carrier member progresses along the plate 102. The amount of resistance is determined by the fulcrum spacing and the friction imposed by the strength of the tension spring 110 as reduced by the lesser strength of the compression spring 107. The resistance supplied normally results in the carrier member 31 being gradually retarded and ultimately stopped within the extent of the plate 102, at least well below the outer end of the plate 102. In this position, the carrier member is not yet fully positioned at the end of the tube end portion 49.

To allow the carrier member 31 to be fully positioned at the tube end portion 49, the latching element 108 is retracted by a cylinder-piston mechanism 112 mounted between the latching element leg 111 and the outside of the tube end portion 49 below the latching element leg 111. This cylinder-piston mechanism 112 operates in response to actuation of a switch 113 mounted for engagement with the latching element leg 111 so that when the latching element 111 has been moved outwardly by the force of the carrier member 31, the switch 113 will be disengaged by the latching element leg 111, which causes the cylinder-piston mechanism 112 to further retract the latching element 108 and the plate 102 that is held against the latching element so that the force of the blower will cause the carrier member to rise to the end of the tube end portion 49. In doing so, the movement of the carrier member 31 may be stopped by the aforementioned cushioning blocks 96 and 98. The operation of the cylinder-piston mechanism 112 is maintained for only sufficient time to allow the carrier member to rise to the end of the tube end portion 49, and, before the blower stops, the cylinder-piston mechanism 112 is deactuated so that the tension spring 112 will cause the latching element 108 to move radially inwardly under the projection 104 on the carrier member 31 so that the carrier member will be retained at the outer end of the tube end portion 49 in proper position for removal of the cover 55.

As the latching element 108 supports the carrier member 31 at only one side, there could be a tendency for the carrier member to be canted slightly, causing problems in the previously described cover removal and replacement operations. To avoid possible canting, a longitudinally extending positioning ridge 114 is formed on the inside of the tube end portion 49 at each terminal in line with the latching element 108 and at a location for engagement of the carrier member projection 104 that is adjacent the inner end of the carrier member. The ridge 114 projects radially inwardly sufficient to maintain the carrier member 31 in substantially axial alignment in the tube end portion 49.

Figure 23:
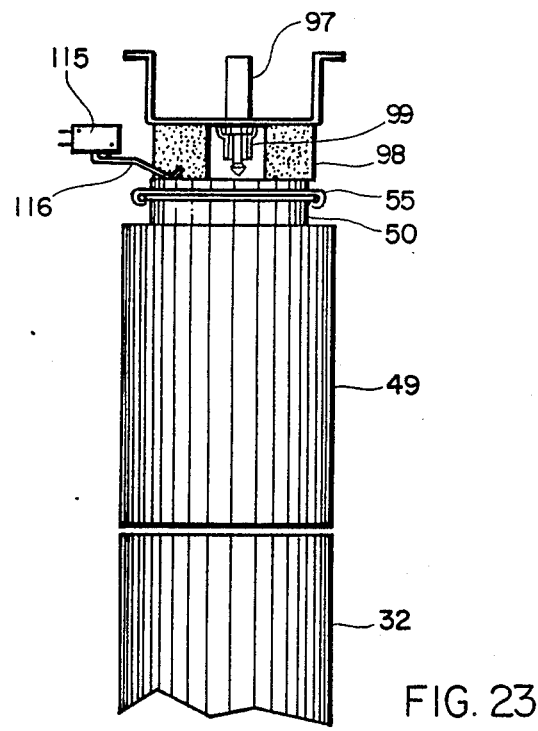
FIG. 23 is a view similar to FIG. 22 illustrating the position of the components when the carrier member is contacting the sensing switch.
Figure 22:
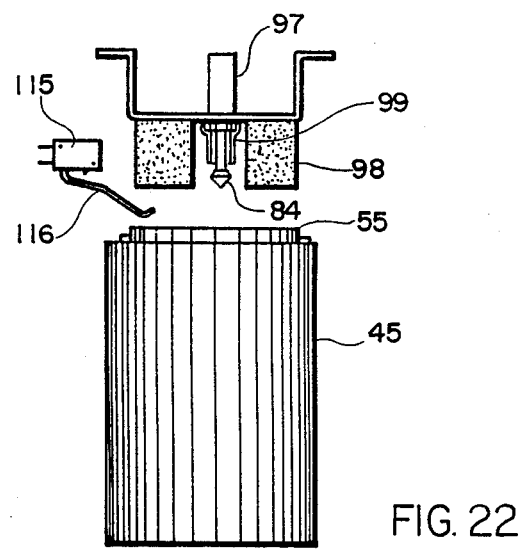
FIG. 22 is an elevational view of the sensing switch and related components that senses when a carrier member of limited weight is raised at a terminal.

As seen in FIGS. 22 and 23, a switch 115 is mounted above the terminal position of the carrier member 31 and has an actuating arm 116 projecting into the path of the carrier member 31. This switch 115 controls the cylinder-piston mechanism 112 of the latching element 108 to provide therewith means for retracting the latching element when the actuating arm 116 of the switch 115 is moved by contact with the carrier member 31. With this arrangement, before a carrier member 31 is released for conveyance through the tube 32, the blower 36 is actuated in a direction to urge the carrier member 31 upwardly from the tube end portion 49. If the weight of the carrier member 31 and its contents is within a limited weight that the blower is able to overcome and raise the carrier member, the carrier member 31 will contact the actuating arm 116 of the switch 115, causing retraction of the latching element 108 and, upon reversal of the blower valves 43, 44 and 45, releasing of the carrier member 31 downwardly into the tube 32 for conveyance therethrough. On the other hand, if the carrier member 31 has been overloaded and is of a weight greater than the limited weight, the blower will not be able to raise the carrier member 31 into contact with the actuating arm 116, with the result that the latching element 108 will remain in latching position, preventing an overweight carrier member from dropping into the tube 31. This arrangements serves as a safety device to prevent overweight carrier members being released into the tube when they are too heavy to be conveyed through the tube by the blower.

Figure 24:
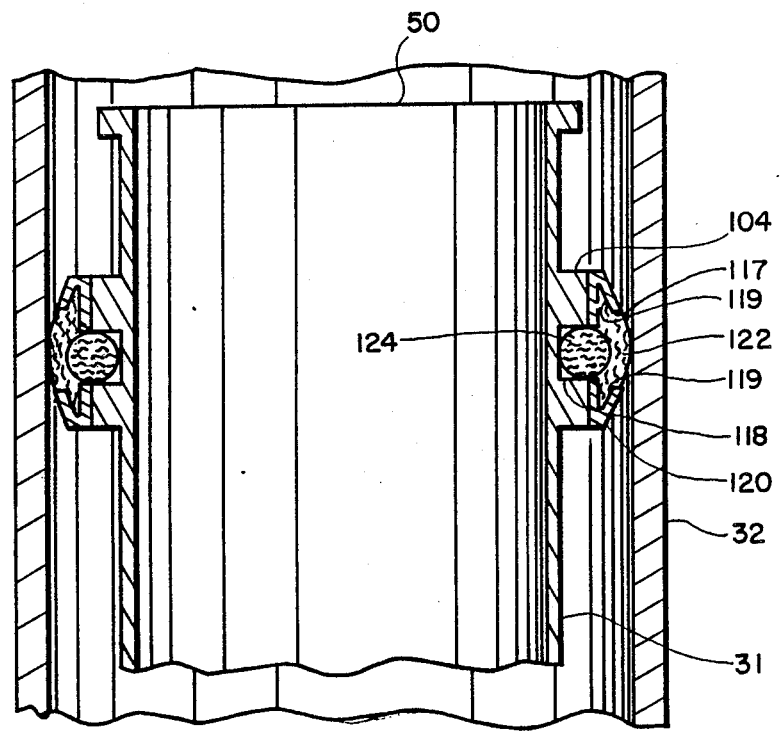
FIG. 24 is a sectional view of the end of a carrier member in a tube with the carrier member having the sealing assembly of the preferred embodiment of the present invention.
Figure 25:
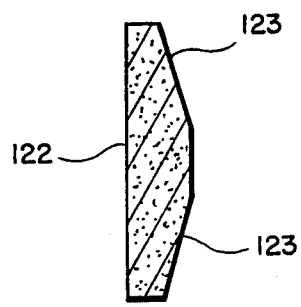
FIG. 25 is a sectional view of the sealing strip included in the sealing assembly of FIG. 24.

As seen in FIGS. 24 and 25, each annular projection 104 on the carrier member 31 is formed with an outwardly facing annular groove 117 having a central annular recess 118 and opposed annular side recesses 119. A compressible sealing strip is retained in and projects from the groove 117 for contact with the inner wall of the tube 32. This sealing strip 122 as seen in FIG. 25, has tapered edge portions 123 that are retainingly seated in the side recesses 119 to retain the sealing strip 122 in position, but alowing for ready removal and replacement. An annular base strip 124 of square or circular cross section is seated in the central recess 118 behind the sealing strip 122 and projects outwardly against the inner side of the sealing strip 122 for outward deflection thereof.

The sealing strip 122 may be made of compact felt material to provide pneumatic sealing sufficient for the purposes of the device and sufficiently compressible to accommodate variations in dimensions of the tube 32 during conveyance of the carrier member 31 therethrough. The base strip 124 is resilient and may be made of foamed elastomeric material so as to be compressibile.

Figure 26:
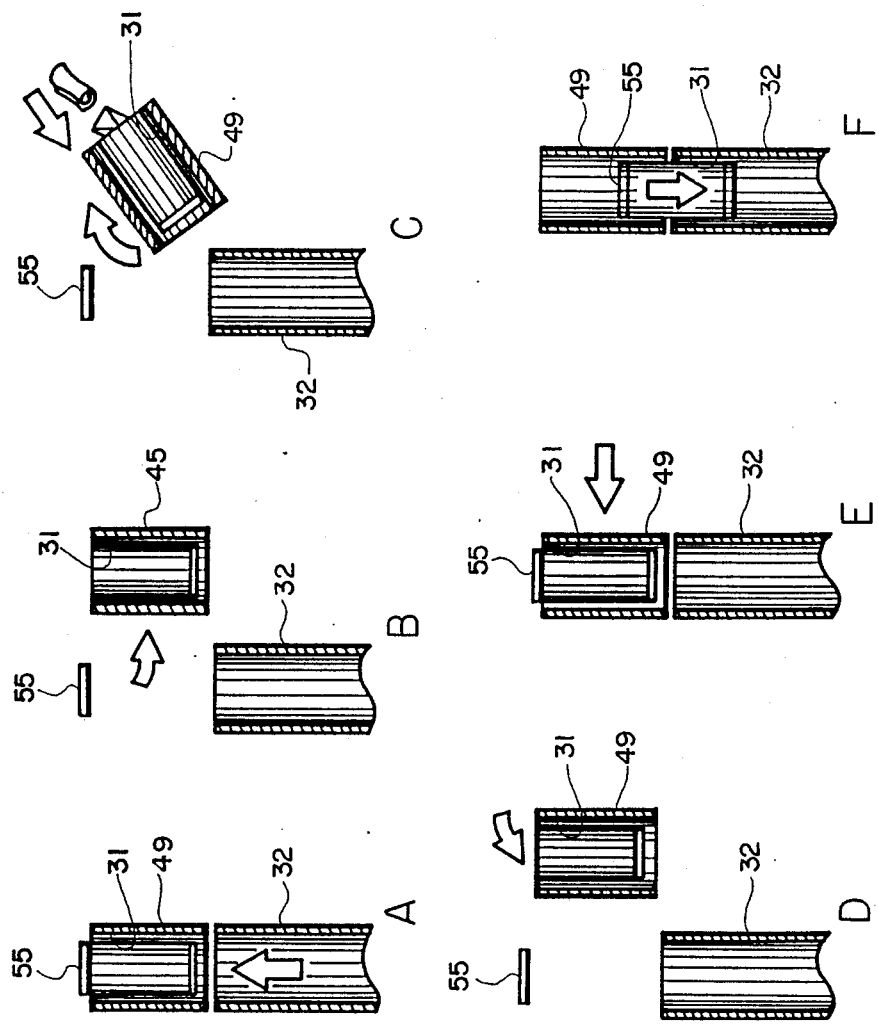
FIGS. 26 A-F are diagrammatic views of the manipulation of the end portion of the tube and the carrier member at the exterior terminal of the apparatus of the present invention.
Figure 27:
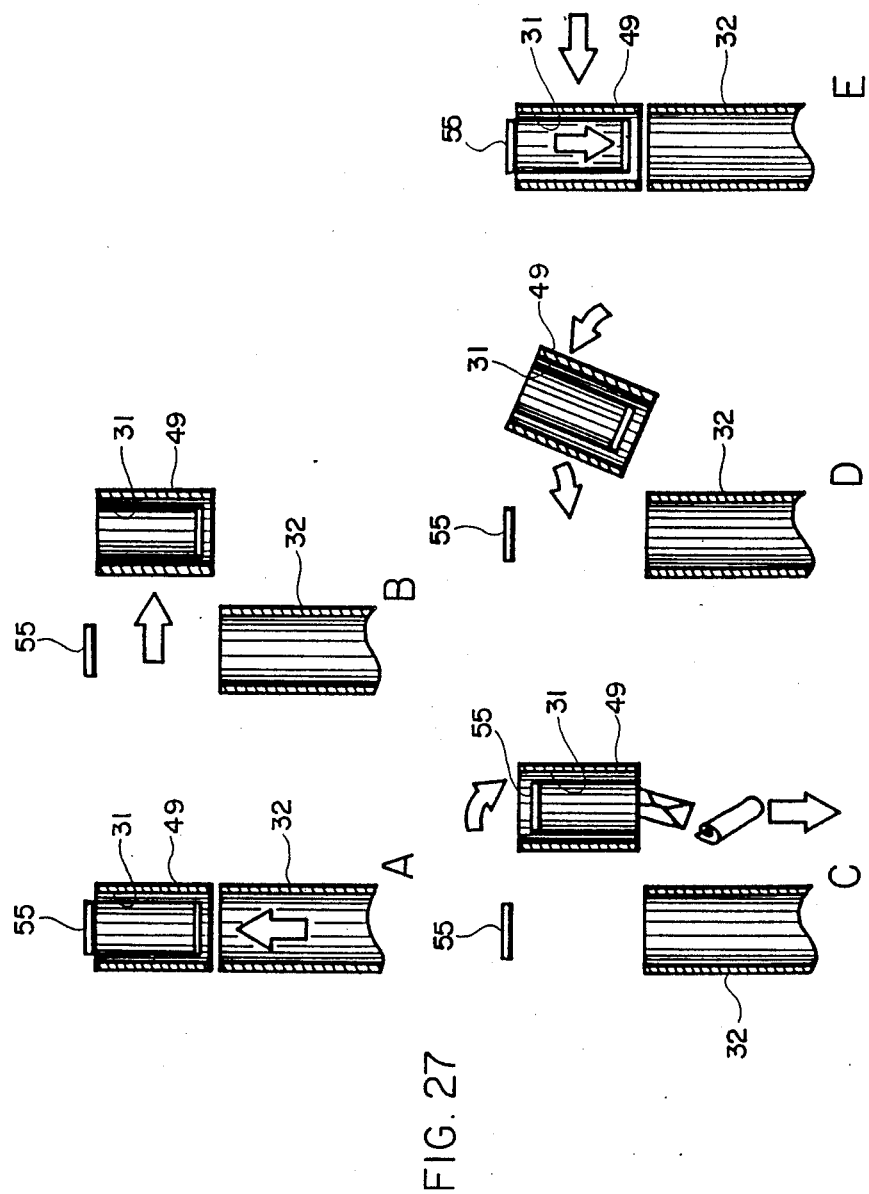
FIGS. 27 A-E are diagrammatic views of the manipulation of the end portion of the tube and the carrier member at the interior terminal of the apparatus of the present invention.

In operation, with reference to FIGS. 26 and 27, the carrier member 31 is initially positioned in the tube end portion 49 at the exterior terminal 33 in the inclined position shown in FIG. 26C for receipt of mail or other articles with the cover 55 retained separately. When the sequence of operation is initiated, the tube end portion 49 is returned to its upright position (FIG. 26D) and returned to the position above the tube 32, and the cover 55 is replaced (FIG. 26E). The weight of the carrier member and contents is then tested. If the carrier member is not overweight, it is released into the tube for conveyance from the exterior terminal (FIG. 26F) to the interior terminal 34 at which it is received in the tube end portion 49 (FIG. 27A). The cover 55 is then removed and the tube end portion 49 moved away from the tube with the cover 55 supported separate from the carrier member 31 (FIG. 27B). The tube end portion 49 is then inverted to discharge the contents from the carrier member 31 (FIG. 27C), following which the tube end portion 49 is returned to its initial position above the tube 32 (FIG. 27D), the cover 55 is replaced, and the carrier member 31 is released into the tube 32 (FIG. 27E). The carrier member is then conveyed through the tube 32 to the exterior terminal 33 at which it is received in the tube end portion 49 (FIG. 26A) at which the cover 55 is removed and the tube end portion 49 moved (FIG. 26B) to the initial inclined article receiving position (FIG. 26C).

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. An apparatus for propelling a carrier member along a pneumatic conveyor tube between two spaced-apart terminals, comprising:
    (a) a blower having a suction intake and a blower output;
    (b) conduit means interconnecting said blower to the pneumatic tube at two spaced-apart junctions therein;
    (c) means for sensing the presence of said carrier member in said pneumatic tube intermediate said spaced-apart junctions;
    (d) first valve means alternatively connecting said blower intake and output through said conduit means to said tube for alternatively creating carrier member propelling suction through one of said junctions through the tube past said other junction and creating carrier member propelling pressure in said tube through the other junction upon said sensing means sensing the presence of the carrier member in the tube intermediate said junctions for propelling said carrier member to one of said terminals; and
    (e) second valve means in said conduit means for reversing the connection of said blower intake and output to said junctions for propelling said carrier member from said one terminal to the other of said terminals.

2. An apparatus for propelling a carrier member according to claim 1 and characterized further in that during reversing by said second valve means, said first valve means reversely connects said blower intake and output through said other junction and said one junction.

3. Apparatus for conveying material from one terminal to another, comprising:
    (a) a hollow carrier member for containing material to be conveyed and having at least one end and a removable cover for said end;
    (b) a conveyor tube extending between said terminals for conveyance of said carrier member therethrough;
    (c) means for conveying said carrier member through said tube;
    (d) said tube having a separately manipulatable, open-ended, end portion at at least one terminal for receipt and temporary retention of said carrier member therein with said end of said carrier member outermost;
    (e) means for releasably retaining said carrier member in said end portion;
    (f) means for removing and replacing said end cover while said carrier member is retained in said end portion and yieldable latching elements on said cover latchingly engagable with said carrier member and an unlatching element engagable with said latching elements to unlatch said latching elements from said carrier memeber and to support said cover separate from said carrier member; and
    (g) said end portion being manipulatable with said carrier member retained therein from alignment with said tube for receipt and discharge of said carrier member to a position out of alignment with said tube for transfer of material through said carrier member end.

4. Apparatus for conveying material according to claim 3 and characterized further in that in said position out of alignment with said tube said end portion is in a position for receiving material.

5. Apparatus for conveying material according to claim 4 and characterized further in that in said material receiving position said end portion is inclined with said carrier member end uppermost.

6. Apparatus for conveying material according to claim 3 and characterized further in that in said position out of alignment with said tube said end portion is in a position for discharging material.

7. Apparatus for conveying material according to claim 6 and characterized further in that said material discharging position said end portion and carrier member are inverted with the carrier member end lowermost.

8. Apparatus for conveying material according to claim 3 and characterized further in that said tube has a said separately manipulatable, openended, end portion at each terminal, with one end portion being manipulatable to a position for said carrier member to receive material at one terminal and the other end portion being manipulatable to a position for said carrier member to discharge material at the other terminal.

9. Apparatus for conveying material according to claim 3 and characterized further in that said latching elements are radially yieldable outwardly and said unlatching element is centrally located.

10. Apparatus for conveying material according to claim 9 and characterized further in that said carrier member is formed with a radially projecting flange corresponding with each said latching element, and each said latching element includes an inturned outer end engagable under said flange to latch said cover on said carrier member and movable out of flange engagement upon said unlatching element engaging said latching elements.

11. Apparatus for conveying material according to claims 3, 9, or 10 and characterized further by spring means mounted on said cover in engagement with said latching elements to normally urge said latching elements in latching engagement with said carrier member and in cover supporting engagement with said unlatching element.

12. Apparatus for conveying material according to claim 11 and characterized further in that said unlatching element is removable from engagement with said latching elements to permit said latching elements to return to engagement with said carrier member to latch said cover on said carrier member, and said means for removing and replacing said end cover includes means for retaining said cover on said carrier member during removal of said unlatching element.

13. Apparatus for conveying material according to claims 9 or 10 and characterized further by spring means mounted on said cover in engagement with said latching elements to normally urge said latching elements in latching engagement with said carrier member and in cover supporting engagement with said unlatching element, and in that said unlatching element is axially movable in engagement with said latching elements and has a portion of increasing radial extent for moving said latching elements radially to unlatch the cover from the carrier member and has a portion of reduced radial extent beyond said increasing radial extent portion for cover supporting engagement of said latching elements, with the radial extent of said reduced radial extent portion being sufficient to maintain said latching elements unlatched from said carrier member.

14. Apparatus for conveying material according to claim 13 and characterized further in that said portion of increasing radial extent is in the form of an inverted cone and said reduced radial extent portion is in the form of an annular recess.

15. Apparatus for conveying material according to claim 14 and characterized further in that said cover is formed with a centering aperture in alignment with said unlatching element and in the form of an inverted cone corresponding with the shape of said portion of increasing radial extent for engagement therewith to maintain said unlatching element axially positioned during support of said cover thereon.

16. Apparatus for conveying material according to claim 13 and characterized further in that said cover is formed with a centering aperture in alignment with said unlatching element for engagement therewith to maintain said unlatching element axially positioned during support of said cover thereon.

17. Apparatus for conveying material according to claim 12 and characterized further in that said unlatching element is removable from engagement with said latching elements to permit said latching elements to return to engagement with said carrier member to latch said cover on said carrier member, and said means for removing and replacing said end cover includes means for retaining said cover on said carrier member during removal of said unlatching element.

18. Apparatus for conveying material from one terminal to another, comprising:
  (a) a hollow carrier member for containing material to be conveyed and having at least one end and a removable cover for said end;
  (b) a conveyor tube extending between said terminals for conveyance of said carrier member therethrough;
  (c) means for conveying said carrier member through said tube;
  (d) means for removing and replacing said end cover, including yieldable latching elements on said cover latchingly engagable with said carrier member, and an unlatching element engagable with said latching elements to unlatch said latching elements from said carrier member and to support said cover separate from said carrier member.

19. Apparatus for conveying material according to claim 18 and characterized further in that said latching elements are radially yieldable outwardly and said unlatching element is centrally located.

20. Apparatus for conveying material according to claim 19 and characterized further in that said carrier member is formed with a radially projecting flange corresponding with each said latching element, and each said latching element includes an inturned outer end engagable under said flange to latch said cover on said carrier member and movable out of flange engagement upon said unlatching element engaging said latching elements.

21. Apparatus for conveying material according to claims 18, 19 or 20 and characterized further by spring means mounted on said cover in engagement with said latching elements to normally urge said latching elements in latching engagement with said carrier member and in cover supporting engagement with said unlatching element.

22. Apparatus for conveying material according to claim 21 and characterized further in that said unlatching element is removable from engagement with said latching elements to permit said latching elements to return to engagement with said carrier member to latch said cover on said carrier member, and said means for removing and replacing said end cover includes means for retaining said cover on said carrier member during removal of said unlatching element.

23. Apparatus for conveying material according to claims 19 or 20 and characterized further by spring means mounted on said cover in engagement with said latching elements to normally urge said latching elements in latching engagement with said carrier member and in cover supporting engagement with said unlatching element, and in that said unlatching element is axially movable in engagement with said latching elements and has a portion of increasing radial extent for moving said latching elements radially to unlatch the cover from the carrier member and has a portion of reduced radial extent beyond said increasing radial extent portion for cover supporting engagement of said latching element, with the radial extent of said reduced radial extent portion being sufficient to maintain said latching elements unlatched from said carrier member.

24. Apparatus for conveying material according to claim 23 and characterized further in that said portion of increasing radial extent is in the form of an inverted cone and said reduced radial extent portion is in the form of an annular recess.

25. Apparatus for conveying material according to claim 24 and characterized further in that said cover is formed with a centering aperture in alignment with said unlatching element and in the form of an inverted cone corresponding with the shape of said portion of increasing radial extent for engagement therewith to maintain said unlatching element axially positioned during support of said cover thereon.

26. Apparatus for conveying material according to claim 23 and characterized further in that said cover is formed with a centering aperture in alignment with said unlatching element for engagement therewith to maintain said unlatching element axially positioned during support of said cover thereon.

27. Apparatus for conveying material according to claim 23 and characterized further in that said unlatching element is removable from engagement with said latching elements to permit said latching elements to return to engagement with said carrier member to latch said cover on said carrier member, and said means for removing and replacing said end cover includes means for retaining said cover on said carrier member during removal of said unlatching element.

28. Apparatus for conveying material from one terminal to another, comprising:
   (a) a carrier member for containing material to be conveyed;
   (b) a conveyor tube extending between said terminals for conveyance of said carrier member therethrough and having ends at said terminals;
   (c) means for pneumatically conveying said carrier member through said tube;
   (d) means in said tube at at least one terminal for gradually retarding movement of said carrier member, said means including:
      (i) a carrier member engaging element movable laterally inwardly of said tube into the path of said carrier member and having a carrier member engaging surface extending longitudinally within said tube; and
      (ii) means yieldably urging said carrier member engaging element inwardly for engagement of said carrier member to gradually retard said carrier member as it advances along said surface;
   (e) means sensing the presence of the carrier member at the end of said tube at said at least one terminal, and means responsive to sensing of a carrier member by said sensing means for retracting said carrier member engaging element from the path of said carrier member to allow said pneumatically conveying means to move said carrier member in said tube.

29. Apparatus for conveying material according to claim 28 and characterized further in that said carrier member engaging element is disposed for retarding and stopping said carrier member at a spacing from a position at said terminal and said retracting means retracts said element to allow said pneumatically conveying means to convey said carrier member to said terminal position.

30. Apparatus for conveying material according to claim 29 and characterized further in that said yieldably urging means includes a latching element engagable with said carrier member engaging element and extendible into latching engagement with said carrier member upon release of said retracting means to latch said carrier member in said terminal position.

31. Apparatus for conveying material according to claim 30 and characterized further in that said carrier member has an outer annular projection engagable with said carrier member engaging surface, and said latching element is engagable with said projection to latch said carrier member in said terminal position.

32. Apparatus for conveying material according to claims 28, 29, 30, or 31 and characterized further in that said carrier member engaging element is pivotably mounted for yieldable disposition at an inclination to the path of said carrier member.

33. Apparatus for conveying material according to claim 32 and characterized further in that said tube is generally cylindrical and said carrier member engaging surface is arcuately shaped in general correspondence with the cylindrical shape of said tube.

34. An apparatus for propelling a carrier member along pneumatic conveyor tube between two spaced-apart terminals, wherein said tube has a generally upwardly facing end at at least one terminal, comprising:
   (a) reversible means for pneumatically conveying said carrier member in said tube to said terminals;
   (b) means for releasably retaining said carrier member at said upwardly facing tube end against downward movement into said tube without preventing upward movement of said carrier member;
   (c) said reversible conveying means being operable to raise a carrier member of limited weight from said retaining means and inoperable to raise a carrier member heavier than said limited weight;
   (d) means for sensing the raising of a carrier member from said retaining means; and
   (e) said releasably retaining means being operable in response to said sensing means sensing the raising of a carrier member to release said carrier member for downward movement into said tube for conveyance in said tube upon reversal of said reversible conveying means, and retaining an overweight carrier member against downward movement into said tube.

35. An apparatus for propelling a carrier member according to claim 34 and characterized further in that said means for releasably retaining said carrier member includes a latching element engagable with said carrier member for latching said carrier member at said tube end, and means for retracting said latching element in response to said sensing means sensing the raising of a carrier member.

36. An apparatus for propelling a carrier member according to claim 35 and characterized further in that said carrier member has an outer annular projection and said latching element is engagable under said projection to releasably retain said carrier member at said tube end.

37. A sealing assembly in an annular projection on a carrier member that is conveyed in a pneumatic conveyor tube, comprising: an outwardly facing annular groove having a central annular recess and opposed annular side recesses, a compressible sealing strip retained in and projecting from said groove and having edge portions retainingly seated in said side recesses, and an annular base strip seated behind the sealing strip in said central recess and projecting outwardly of said central recess for outward deflection of said sealing strip.

38. A sealing assembly in an annular projection on a carrier member that is conveyed in a pneumatic conveyor tube, according to claim 37 and characterized further in that said base strip is resilient for urging said sealing strip outwardly.

39. A sealing assembly in an annular projection on a carrier member that is conveyed in a pneumatic conveyor tube according to claim 38 and characterized further in that said sealing strip is made of felt material.

40. A sealing assembly in an annular projection on a carrier member that is conveyed in a pneumatic conveyor tube according to claim 39 and characterized further in that said base strip is made of foamed elastomeric material.

* * * * *

UNITED STATES PATENT AND TRADEMARK OFFICE
CERTIFICATE OF CORRECTION

PATENT NO. : 4,941,777

DATED : July 17, 1990

INVENTOR(S) : John P. Kieronski

It is certified that error appears in the above-identified patent and that said Letters Patent is hereby corrected as shown below:

Column 1, Line 7, delete "00,876" and insert therefor -- 000,876 --.

Column 2, Line 48, delete "includes in" and insert therefor -- includes an --.

Column 4, Line 10, after "is not" delete -- of --.

Column 6, Line 65, delete "has" and insert therefor -- have -- .

Column 10, Line 5, delete "unlatching element 94" and insert therefor -- unlatching element 84 --.

Column 10, Line 39, delete "unlatching element 34" and insert therefor -- unlatching element 84 --.

Column 10, Line 63, delete "plate 103" and insert therefor -- plate 102 --.

Column 12, Line 35, delete "arrangements" and insert therefor -- arrangement --.

Column 12, Lines 60-61, delete "compressibile" and insert therefor -- compressible --.

Column 14, Line 32, delete "memeber" and insert therefor -- member --.

UNITED STATES PATENT AND TRADEMARK OFFICE
CERTIFICATE OF CORRECTION

PATENT NO. : 4,941,777

DATED : July 17, 1990

INVENTOR(S) : John P. Kieronski

It is certified that error appears in the above-identified patent and that said Letters Patent is hereby corrected as shown below:

Column 14, Line 53, after "that" add -- in -- .

Column 14, Line 59, delete "openended" and insert therefor -- open-ended --.

Signed and Sealed this

Sixth Day of July, 1993

Attest:

MICHAEL K. KIRK

Attesting Officer

Acting Commissioner of Patents and Trademarks